United States Patent
Bladt et al.

(10) Patent No.: US 11,910,140 B2
(45) Date of Patent: Feb. 20, 2024

(54) CORK-LEATHER-COVERED LOUDSPEAKER GRILLE

(71) Applicant: HARMAN BECKER AUTOMOTIVE SYSTEMS GmbH, Karlsbad-Ittersbach (DE)

(72) Inventors: Henrik H. Bladt, Vinderup (DK); Ole Kruse Witschel, Holstebro (DK)

(73) Assignee: Harman Becker Automotive Systems GMBH, Karlsbad-Ittersbach (DE)

( * ) Notice: Subject to any disclaimer, the term of this patent is extended or adjusted under 35 U.S.C. 154(b) by 29 days.

(21) Appl. No.: 17/742,949

(22) Filed: May 12, 2022

(65) Prior Publication Data

US 2022/0369010 A1 Nov. 17, 2022

(30) Foreign Application Priority Data

May 12, 2021 (EP) .................................. 21173537

(51) Int. Cl.
*H04R 1/02* (2006.01)
*H04R 31/00* (2006.01)
*B60R 13/02* (2006.01)

(52) U.S. Cl.
CPC ............. *H04R 1/023* (2013.01); *H04R 1/025* (2013.01); *H04R 31/00* (2013.01); *B60R 13/0243* (2013.01); *H04R 2499/13* (2013.01)

(58) Field of Classification Search
CPC ........ H04R 1/023; H04R 1/025; H04R 31/00; H04R 2499/13; B60R 13/0243
USPC .......................................................... 381/86
See application file for complete search history.

(56) References Cited

U.S. PATENT DOCUMENTS

| 4,944,686 | A | * | 7/1990 | Gertz | H01R 4/5033 439/177 |
| 6,096,166 | A | * | 8/2000 | Liou | H04R 31/006 156/515 |
| 2005/0156369 | A1 | | 7/2005 | Kantor | |
| 2007/0187173 | A1 | | 8/2007 | Price | |
| 2018/0146281 | A1 | * | 5/2018 | Spero | H04R 1/025 |
| 2019/0014406 | A1 | * | 1/2019 | Qin | H04R 9/06 |

FOREIGN PATENT DOCUMENTS

| CN | 212555107 U | 2/2021 |
| JP | 07225589 A | 8/1995 |

OTHER PUBLICATIONS

Extended European Search Report, serial No. 21173537.8, dated Nov. 4, 2021, 9 pages.

* cited by examiner

Primary Examiner — Sean H Nguyen
(74) Attorney, Agent, or Firm — Artegis Law Group, LLP

(57) ABSTRACT

A loudspeaker grille comprises a carrier element, which comprises a plurality of openings through a front surface, and a cover element to be attached to the front surface, which comprises a plurality of openings corresponding to the openings of the carrier element. The cover element is attached to the carrier front surface, wherein the cover element covers at least part of the front surface of the carrier element, and wherein the openings of the carrier element and the cover element are aligned with each other. The cover element is made of a flexible organic material, in particular a compound material with an organic outer surface layer, such as cork-leather.

14 Claims, 11 Drawing Sheets

CORK-LEATHER-COVERED LOUDSPEAKER GRILLE

CROSS-REFERENCE TO RELATED APPLICATIONS

This application claims the priority of co-pending European patent application titled, "CORK-LEATHER-COVERED LOUDSPEAKER GRILLE" filed on May 12, 2021 and having Serial No. 21173537.8. The subject matter of this related application is hereby incorporated herein by reference

BACKGROUND

Field of the Various Embodiments

Various examples generally relate to a loudspeaker cover, and specifically to a cork-leather-covered loudspeaker grille. Further, a corresponding system and method for producing a cork-leather-covered loudspeaker grille, as well as a loudspeaker and a vehicle comprising at least one loudspeaker grille according to the disclosure are provided.

DESCRIPTION OF THE RELATED ART

Loudspeaker speaker grills, and in more general automotive interior trims and panels, may be elements installed in the vehicle to provide a better look and touch to a vehicle. Numerous trims, such as for example dashboards, door panels, A-pillars, parcel shelfs and similar others may be installed in a vehicle, wherein conventional materials may include for example acrylonitrile butadiene styrene (ABS), polypropylene (PP), polyoxymethylene (POM), thermoplastic elastomer (TPE). In this regard, carbon dioxide footprints and other environmentally harmful substances are sought to be reduced, and a trim part with a perforated hole pattern made of sustainable materials and corresponding manufacturing processes are desired. A challenge in manufacturing an organic material, specifically cork, laminated trim part is the design of acoustically optimized support for the lamination process, and provided with an optimal hole pattern for maximum sound performance without compromising long durability in an automotive interior environment.

Therefore, the idea of the presented approach is to provide an advanced loudspeaker grille, which is covered with a sustainable material, such as cork-leather, and a method and system for producing such a loudspeaker grille, which overcome or mitigate at least some the above-identified limitations and drawbacks.

SUMMARY

This is done by the subject matter of the independent claims. Further advantageous features are subject matter of the dependent claims.

The solution according to the disclosure is described with respect to the claimed loudspeaker cover as well as with respect to the claimed system and method for manufacturing the loudspeaker cover. Features, advantages, or alternative embodiments herein may be assigned to the other claimed objects, and vice versa. In other words, claims for the systems and methods of producing a loudspeaker grille may be improved with features described or claimed in the context of the loudspeaker grille, and the claims for the loudspeaker grille may be improved with features described or claimed in the context of the methods and systems.

An interior trim or panel, in particular a loudspeaker cover or grille, comprises a carrier element, in short carrier, which can for example be a carrier made from plastic or metal, which has a front surface that faces towards a user. The carrier element has a plurality of openings through the front surface, which connect the front surface and the back surface and are located within the front surface. The loudspeaker, further comprises a cover element, or in short cover or cover material, which may comprise a surface made from a specific organic material, and may have form of a sheet of an organic or compound material, and cut to a shape similar to the carrier element. The cover element is attached or fixed to the carrier element, wherein the cover element covers at least partly the front surface of the carrier element. The fixed cover element comprises a plurality of openings, which are aligned with the openings in the carrier element. For example, the cover element may be glued to the carrier element. The cover element is made of a flexible organic material, in particular a compound material with an organic surface, such as for leather.

By covering the carrier element with an organic material, the front surface of the carrier towards a user becomes a surface made of the organic cover material. An organic material may for example be wood or cork or any organic sheet material, or a compound material such as a cork veneer or cork leather, as described in greater detail in the present disclosure. In various examples, the material of the cover element may be a flexible material in forum of a sheet with a thickness of less than 1 mm, 0.5 mm, less than 0.2 mm, or less than 0.1 mm.

The techniques according to the disclosure provide for a sustainable long-lasting and decorative separate speaker grille or integration into a larger trim section for seamless integration into car interiors in particular with cork finish, wherein cork can be substituted with other sustainable design materials such as bark-cloth fiber, vegan leather, wood veneer and many other materials by the disclosed manufacturing methods and assembly principles.

In various examples, the cover element may have a cork surface towards the user, in particular the cover element may be made of cork leather, which in other words may be a cork compound sheet material, which has a flexible cork layer on one surface, which may be attached at least to a carrier layer made of a flexible plastic or cotton layer, as described for example in JP 2018 062 167 A.

The loudspeaker cover may be a separate part to be mounted onto a loudspeaker, or it may be integrally formed in an interior trim of a vehicle, for example a vehicle door interior trim, behind which a loudspeaker may be arranged.

The cover element may be fixed and extend around at least part of the outer edge of the carrier element, wherein the carrier elements may be wrapped around the edge, and extend towards the backside of the carrier, and provide also a cover of the edge of the carrier element, wherein the touch and feel for the user may be improved.

The plurality of openings in the carrier element in the cover element may correspond to each other, and that they have substantially the same dimensions, wherein the are aligned to each other. In other words there edges may be aligned with each other, and form an acoustically transparent front surface.

In other words, the openings in the loudspeaker cover may be aligned and extend from a front side to a backside of the loudspeaker cover, such that the loudspeaker cover may be acoustically transparent or, in other words, have good acoustic characteristics, from a loudspeaker arranged behind the loudspeaker cover through the loudspeaker cover towards a user. In such a way, a loudspeaker may be arranged in an active area behind the cover, which includes the plurality of openings.

The plurality of openings may be arranged in a dense configuration, wherein in an active area, which may be defined by the outer edges of openings positioned around the perimeter of the plurality of openings, the openings have an open area that is >30%, >35%, >40%, >50% or >60% of the active area.

The plurality of openings may be longitudinal elongated openings with a longitudinal axis, wherein perpendicular to the longitudinal axis of the longitudinal openings, the openings may have a distance between the edges <3 mm, <2 mm, or <1 mm between the edges. The longitudinal openings may be aligned with each other, such that the longitudinal axes of the openings may be parallel to each other. The longitudinal openings may be arranged in rows.

The backside of the carrier element may include a plurality of ribs protruding from a back surface of the carrier element, wherein the ribs may extend along the back surface at least partially between the openings. For example, when the longitudinal openings may be arranged in rows, longitudinal ribs may extend in between at least two rows from one edge of the carrier to the other edge.

A system for manufacturing a loudspeaker grille comprises the following elements. A fixture element, or in short fixture, comprising a plurality of spikes. A carrier element with a plurality of openings. A cover element to be attached to the carrier element, wherein the cover element has a surface made of an organic material and further comprises a plurality of openings corresponding to the openings of the carrier element. A press element with a plurality of openings cover spending to the openings in the carrier elements and the openings in the cover element, and/or the spikes in the fixture element. When the carrier element and the cover element are placed adjacent to each other on to the fixture, at least a part or all of the openings are arranged each onto a corresponding spike, wherein the spike extends through the opening. In other words, the openings of the carrier element and the cover element are aligned by the spikes, wherein the spikes extend through the respective surfaces and protrude further out, such that the press element with its openings can also be arranged onto the spikes. When pressure is applied on to the press element, the press elements may be moved towards the fixture and compress the cover onto the carrier, wherein the spikes and further protrude through the press element.

A method for producing a loudspeaker cover comprises the following steps. In a step, a fixture element comprising a plurality of spikes is provided. In a further step, a carrier element with a plurality of openings is provided. In a further step, a cover element to be attached to the carrier element is provided. The cover element has a surface of an organic material and comprises a plurality of openings, corresponding to the openings of the carrier element, in various examples the same number of openings. In various examples it is possible, that the numbers of openings in the carrier and the cover material differ. In a further step, a press element with a plurality of openings is provided. In a further step, the carrier element and the cover element and the press element are placed onto the fixture element, wherein the spikes extend through the openings of the carrier element and the cover element and the press element, wherein the spikes a align the openings of the different elements to each other. In a further step, the cover element is attached, for example using glue, to the carrier element by applying pressure on to the press element.

According to the disclosed techniques, the spikes may extend substantially perpendicular from a base surface of the fixture element, wherein the spikes may have a tapered cross-sectional area, as defined by the outer dimension/edge of the spike, becoming smaller the further away from the base surface. In other examples, the spikes may have a constant cross-sectional area. In other examples, the spikes may have a lower section, in which the cross-sectional area is reduced i.e. tapered with distance from the base plane, and an upper section, where the cross sectional area is constant. In this way, the lateral movement of the press element may be better controlled while moving towards the fixture.

An electronic device, a loudspeaker cover panel and a vehicle comprise at least one loudspeaker cover according to the present disclosure.

For such an system, method, electronic device, loudspeaker, and vehicle, technical effects may be achieved, which correspond to the technical effects described for the loudspeaker cover.

It is to be understood that the features mentioned above and features yet to be explained below can be used not only in the respective combinations indicated, but also in other combinations or in isolation, without departing from the scope of the present disclosure. Features of the described aspects and embodiments may be combined with each other in other embodiments.

Therefore, the above summary is merely intended to give a short overview over some features of some embodiments and implementations and is not to be construed as limiting. Other embodiments may comprise other features than the ones explained above.

BRIEF DESCRIPTION OF THE DRAWINGS

The foregoing and additional features and advantages of the disclosure will become apparent from the following detailed description when read in conjunction with the accompanying drawings, in which like reference numerals refer to like elements.

DETAILED DESCRIPTION

Figure 1:
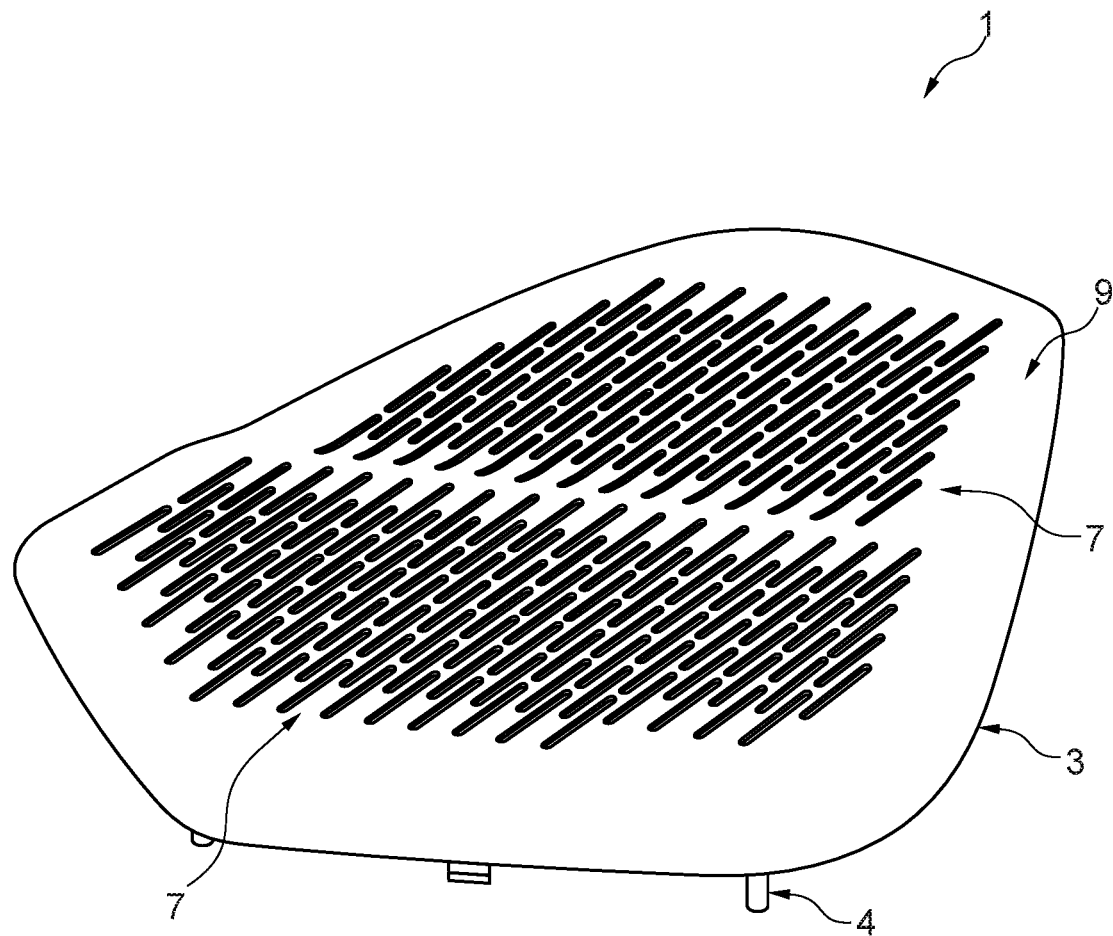
FIG. 1 schematically illustrates a loudspeaker grille, according to embodiments of the disclosure.

The above and other elements, features, steps, and concepts of the present disclosure will be more apparent from the following detailed description in accordance with exemplary embodiments of the disclosure, which will be explained with reference to the accompanying drawings.

It is to be understood that the following description of embodiments is not to be taken in a limiting sense. The scope of the disclosure is not intended to be limited by the embodiments described hereinafter or by the drawings, which are taken to be illustrative examples of the general inventive concept. The features of the various embodiments may be combined with each other, unless specifically noted otherwise.

Although this disclosure describes and illustrates a particular loudspeaker cover with a particularly shaped front surface and a number of openings in particular shapes and sizes, it is to be understood that a loudspeaker cover with any flat, curved or free-forme front surface with any suitable number of and shape of openings may be used to implement the disclosed techniques.

The drawings are to be regarded as being schematic representations, and elements illustrated in the drawings are not necessarily shown to scale. Rather, the various elements are represented such that their function and general purpose become apparent to a person skilled in the art. While embodiments may relate to interior trims in an automotive environment, specifically in a vehicle, and may attached to loudspeaker devices, the disclosed covers are not limited to being used in such devices or environments and may be applied to many other customer products.

Automotive trims may be elements installed in the vehicle to provide a better look and features to the vehicle. Numerous trims, such as for example dashboards, door panels, front & rear bumpers, dashboards, and similar others may be installed in a vehicle, wherein conventional materials of trims may include acrylonitrile butadiene styrene (ABS), polypropylene (PP), polyoxymethylene (POM), thermoplastic elastomer (TPE), and others.

Accordingly it may be desirable to manufacture a plastic speaker grill covered with natural Cork Leather with an acoustic optimized hole pattern for best possible sound performance. The challenge in manufacturing a cork laminated trim part or applied to a separate speaker grill is the design of acoustically optimized support for the laminate provided with optimal hole pattern for maximum sound performance without compromising long durability in an automotive interior environment. Minimization of $CO_2$ footprints and other environmentally harmful substances. A trim part with a perforated hole pattern made of sustainable materials and manufacturing processes is desired.

In the following, detailed techniques for an improved loudspeaker cover with a cork-leather surface, and a system and method for designing and producing such a loudspeaker cover, in accordance with aspects and embodiments of the disclosure, will be explained.

FIG. 1 schematically illustrates a loudspeaker grille 1, according to embodiments of the disclosure.

As can be seen in FIG. 1, a loudspeaker grille 1 comprises a carrier element 4, which has a horizontal substantially plane or a curved front surface 9, which is covered by a cover element 3 made from cork leather. In the front surface 9 there are a plurality of through holes or openings 7, which extend from the front side to the backside of the grille 1, wherein the openings in the carrier and the cover material are aligned and form an acoustically transparent and optimized speaker grille 1.

In the embodiment of FIG. 1, the openings 7 are formed as elongated longitudinal opening, or holes, and are arranged in 2 separate groups. Within each group the longitudinal openings are arranged in lines or rows, wherein the longitudinal axes of each longitudinal opening are aligned in parallel. The loudspeaker grille 1 of FIG. 1 is a separate part which may be attached to a loudspeaker or panel to cover the loudspeaker and provide a user-friendly surface towards a user.

Figure 2:
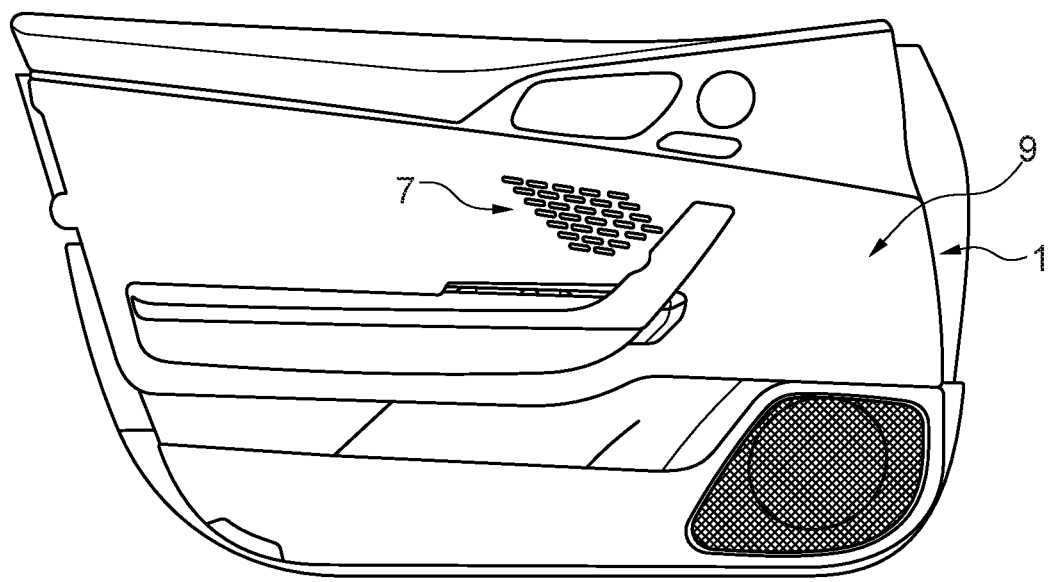
FIG. 2 schematically illustrates a loudspeaker grille integrally formed in a trim of a vehicle door, according to embodiments of the disclosure.

FIG. 2 schematically illustrates a loudspeaker grille 1 integrally formed in a trim of a vehicle door, according to embodiments of the disclosure.

As depicted in FIG. 2, a interior door trim of a vehicle door comprises a relatively large front surface 9 covered with cork leather, which is larger than a loudspeaker. The cork leather covered front surface 9 of the larger door trim is perforated a a central part, in other words it comprises a plurality of openings 7 in the central part, behind which a loudspeaker may be arranged. In other words, the loudspeaker grille is integrally formed in the larger vehicle door trim.

Figure 3:
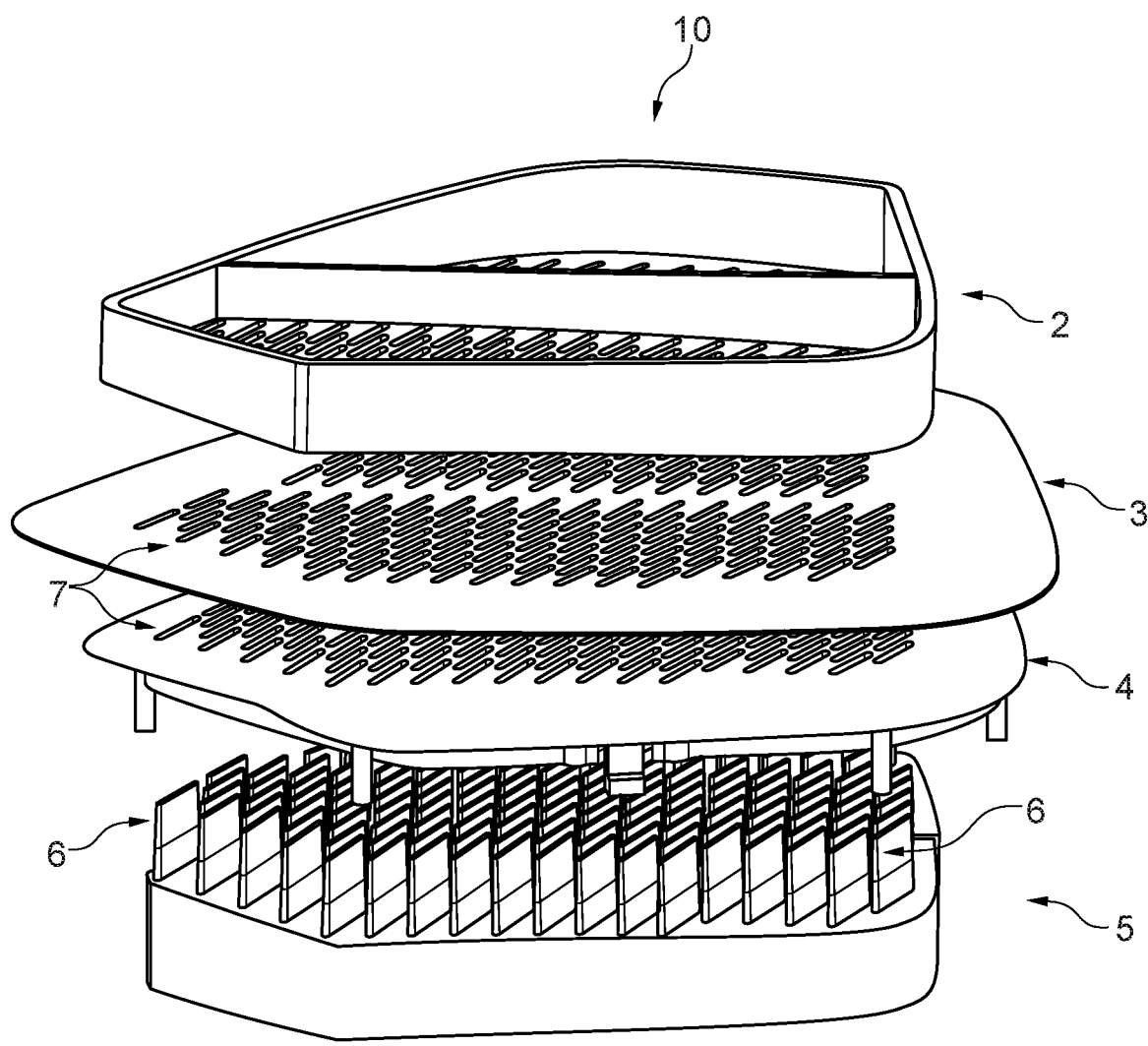
FIG. 3 schematically illustrates a system for manufacturing a loudspeaker cover, according to embodiments of the disclosure.

FIG. 3 schematically illustrates a system 10 for manufacturing a loudspeaker grille 1, according to embodiments of the disclosure.

As can be seen in FIG. 3, the system 10 comprises a fixture element 5, a carrier element 4, a cover element 3 made from cork, and a press element 2. The fixture element 5 is used to place the carrier element 4 on it, wherein the carrier elements is placed onto a plurality of spikes 6, extending from a base plane of the fixture element 5.

When placing the carrier element 4 unto the fixture element 5, the spikes 6 production viewed through the openings 7 in the carrier element 4. Using a tapered outer dimension of the spikes, wherein a cross-sectional area, or in other words a diameter or thickness distance, parallel to the base plane is read used with increasing height from the base plane, the carrier element 4 is mechanically fixed on the fixture element 5, when carrier element 4 has been moved towards the fixture element 5 so far, that the spikes 6 fill the openings 7 of the carrier element 4.

The fixture element 5 is used to hold the carrier element 4 and the cover element 3 made from cork, so it can easily be glued onto the carrier front surface. Therein, the cover element 3 is placed onto the carrier element 4 and fixture element 5 in a similar way as the carrier element 4, wherein the spikes protrude through the openings 7 in the cover element 3. In such a way, the opening 7 in the carrier element 4 and the cover element 3 are aligned to each other, when the carrier elements 4 the cover element 3 are adjacently placed onto each other.

The cover element in FIG. 3 is a laser-cut cork surface with a desired hole pattern. To use cork leather as a decorative speaker cover, the openings 7 of the cork-leather and the carrier element 4 are provided with a hole pattern that forms the necessary acoustic transparency in front of a speaker unit. A hole pattern can be designed according to design wishes but optimized for necessary mechanical stability and durability. Hole pattern and outline may be manufactures e.g. by perforation, punching, laser cutting, water cutting or other method.

When the cork leather is mounted on the carrier element 4, which may be made from recycled plastic, metal or sustainable injection molded wood material, it can be glued in exact position, wherein the hole pattern is lined up with a corresponding hole pattern in the carrier element 4 by the fixture spikes 6.

As can be further seen in FIG. 3, the hole pattern of the cork surface is also lined up to the hole pattern of the press. Once the cork is aligned, the fixtures with the carrier attached will be aligned onto the holes and pressed down through all the holes of the press. This allows the carrier and cork surface to be glued together, avoiding any folds on the cork surface. Pressure can be applied to the press when the cork surface is being glued to the carrier to ensure continuously tangency between the two elements. The finished grill or trim section can be provided with extra surface treatment, such as a sustainable varnish, that protects against dirt and wear for long-term durability.

Figure 4:
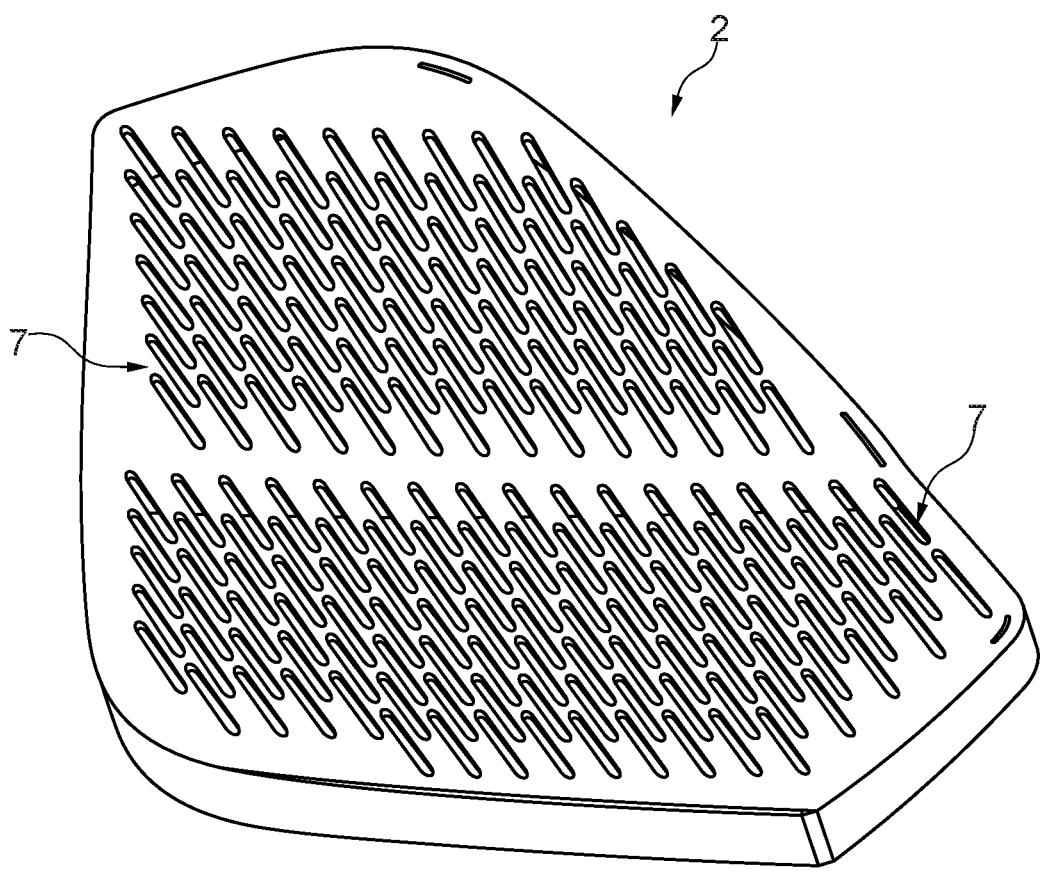
FIG. 4 schematically illustrates a bottom view of the press element of the system of FIG. 3, according to embodiments of the disclosure.

FIG. 4 schematically illustrates a bottom view of the press element 2 of the system of FIG. 3, according to embodiments of the disclosure.

As depicted in FIG. 4, the lower side of the press element 2 to be in touch with the cover element 3 while pressing is a flat or curved or free-form surface complementary to the shape of the carrier element 4, in such a way that the cover material sheets will be pressed evenly against the carrier front surface. In particular, the press elements comprises a plurality of openings 7, which correspond to the spikes in the fixture element, wherein when pressing, the spikes will be moved through the openings 7 in the press elements 2 and the press element may be moved towards the fixture element.

Figure 5:
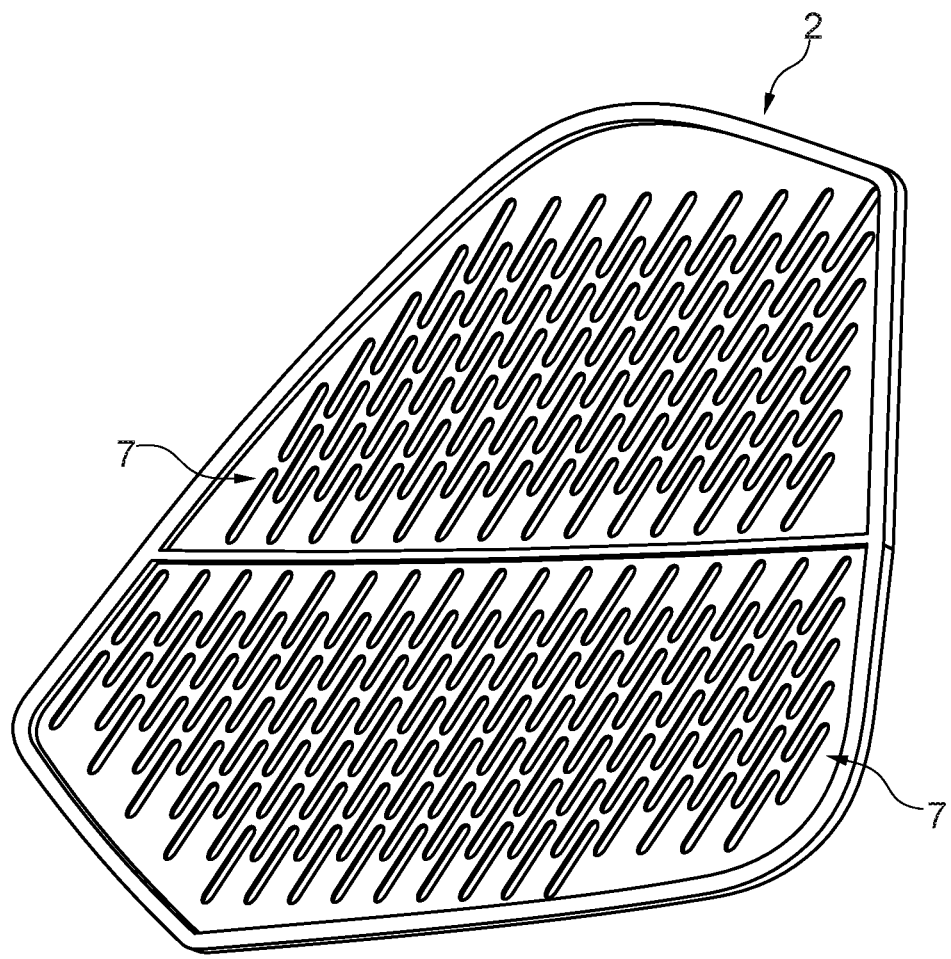
FIG. 5 schematically illustrates a top view of the press element of the system of FIG. 3, according to embodiments of the disclosure.

FIG. 5 schematically illustrates a top view of the press element 2 of the system of FIG. 3, according to embodiments of the disclosure.

The top surface of press element 2 may comprise an a reinforced outer edge with a side wall and a transverse rib for stability. The side wall may be extended to lower side to extend around round corners of carrier element to press cover element around the edges.

Figure 6:
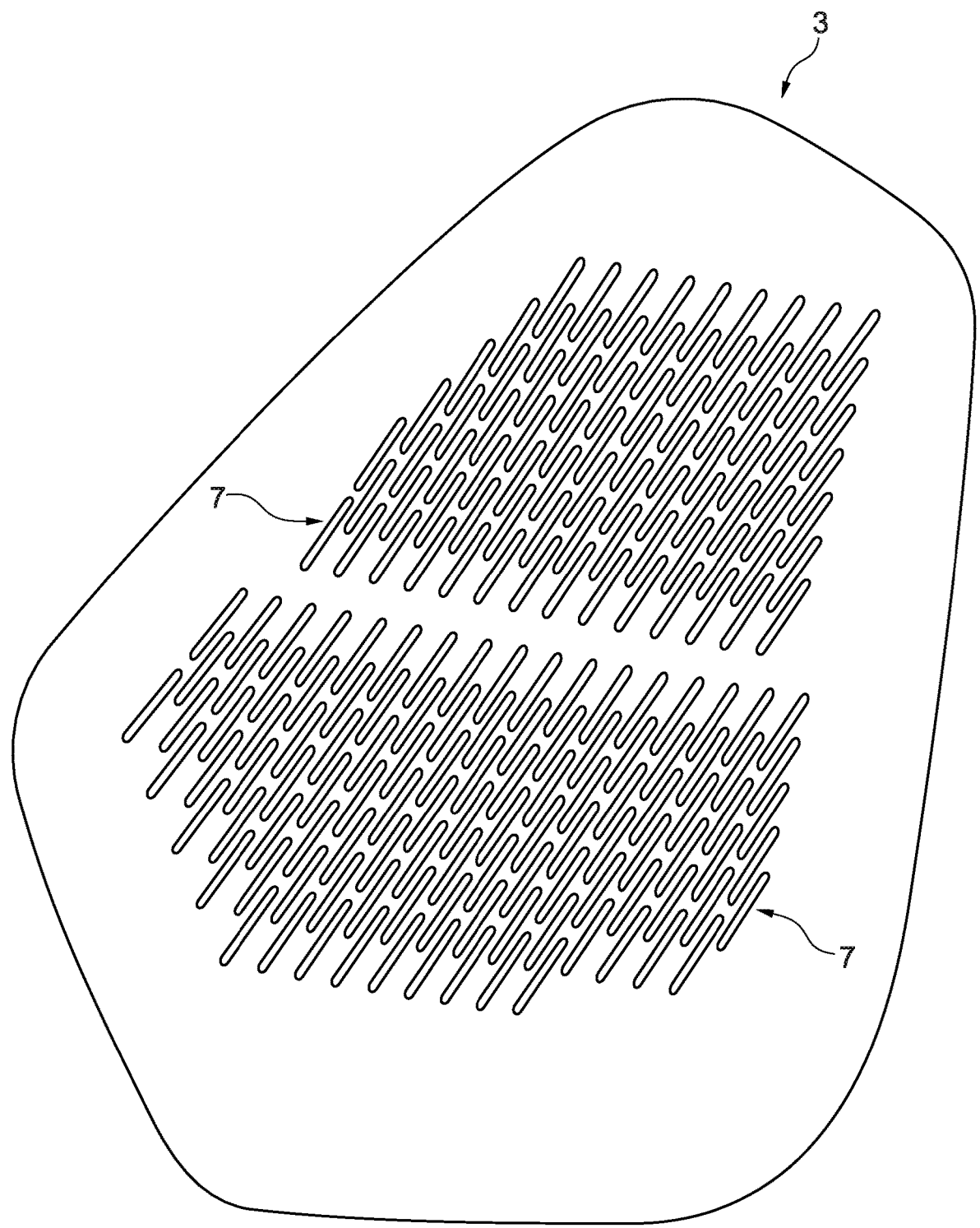
FIG. 6 schematically illustrates the cut cork leather of the system of FIG. 3, according to embodiments of the disclosure.

FIG. 6 schematically illustrates the cover element 3 of the system of FIG. 3, according to embodiments of the disclosure.

The cover element 3 in the example embodiment is a cut cork leather, and comprises a plurality of longitudinal openings corresponding to the openings in the carrier element. Cork is assigned to the group of sustainable materials with a low $CO_2$ footprint and is typically used as a decorative material in fashion and automotive trim. The invention is based on the possibility of use as a decorative material for a speaker grill with an acoustically transparent designed hole pattern. Cork leather is typically a laminate consisting of recycled polyester or cotton fabric where thin cork stripes or cork granules are glued to the fabric as a carrier. The finished laminate is typically 0.5-1.5 mm thick. Cork laminate may be a semi-finished product which is purchased and cut according to the desired size. Cork laminate can be colored to match car interior as desired.

Figure 7:
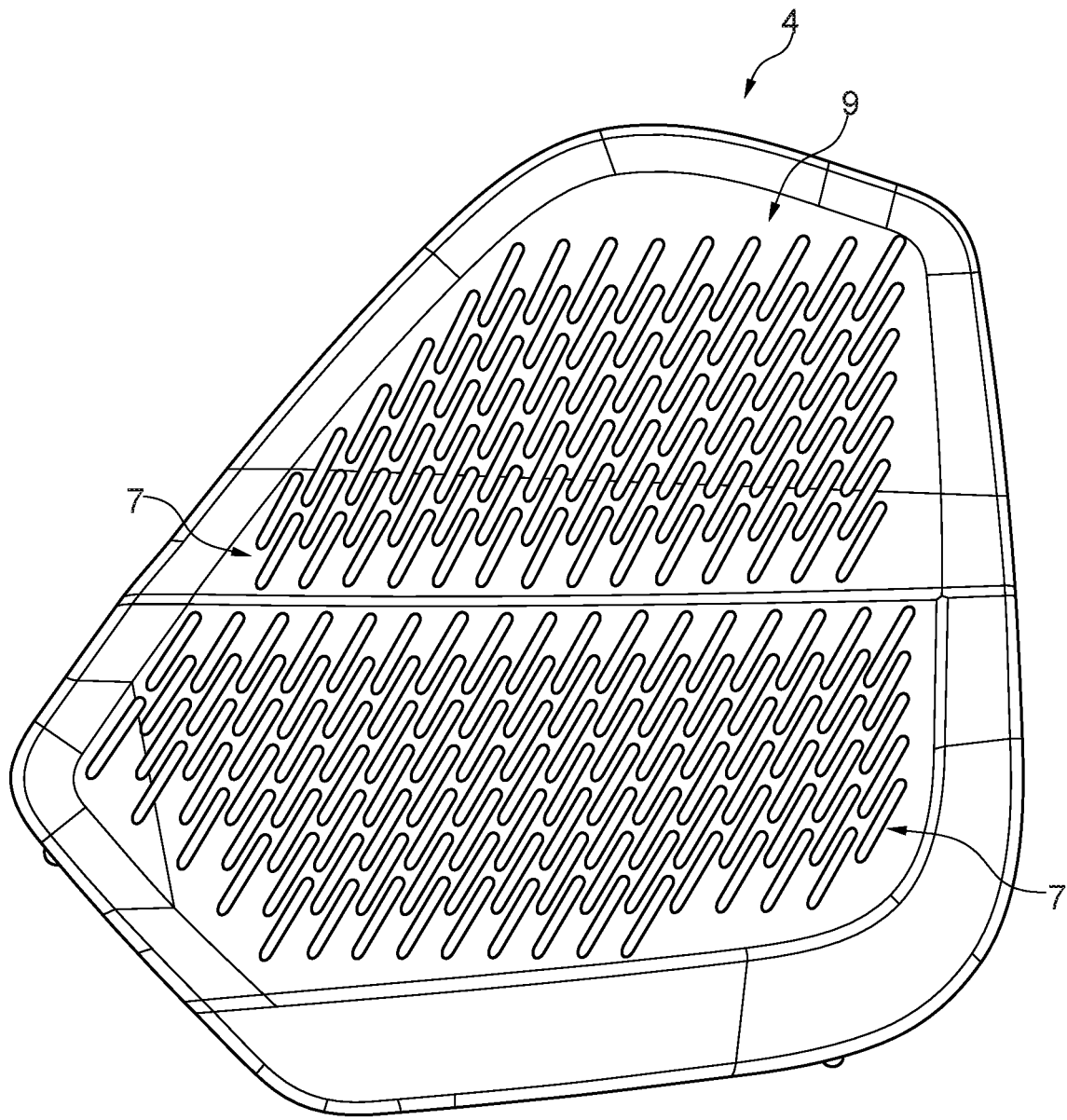
FIG. 7 schematically illustrates a top view of the carrier element of the system of FIG. 3, according to embodiments of the disclosure.

FIG. 7 schematically illustrates a top view of the carrier element of the system of FIG. 3, according to embodiments of the disclosure.

Depicted in FIG. 7 is the front surface 9 of the carrier element 4, onto which the cover material will be glued. The front surface 9 comprises openings 7 grouped into two groups in a central part of carrier element 4, and further comprises a surrounding peripheral curved section including the outer edge of the carrier element 4.

The purpose of the carrier element 4 is to have a solid part that the cork surface can be glued on. A spray glue is applied to the front of the carrier or back of the cork. The cork, once glued onto the carrier, can be bend around the sides of the carrier, and cut. The hole pattern used is created on a 2d surface and then projected onto the grille surface.

Figure 8:
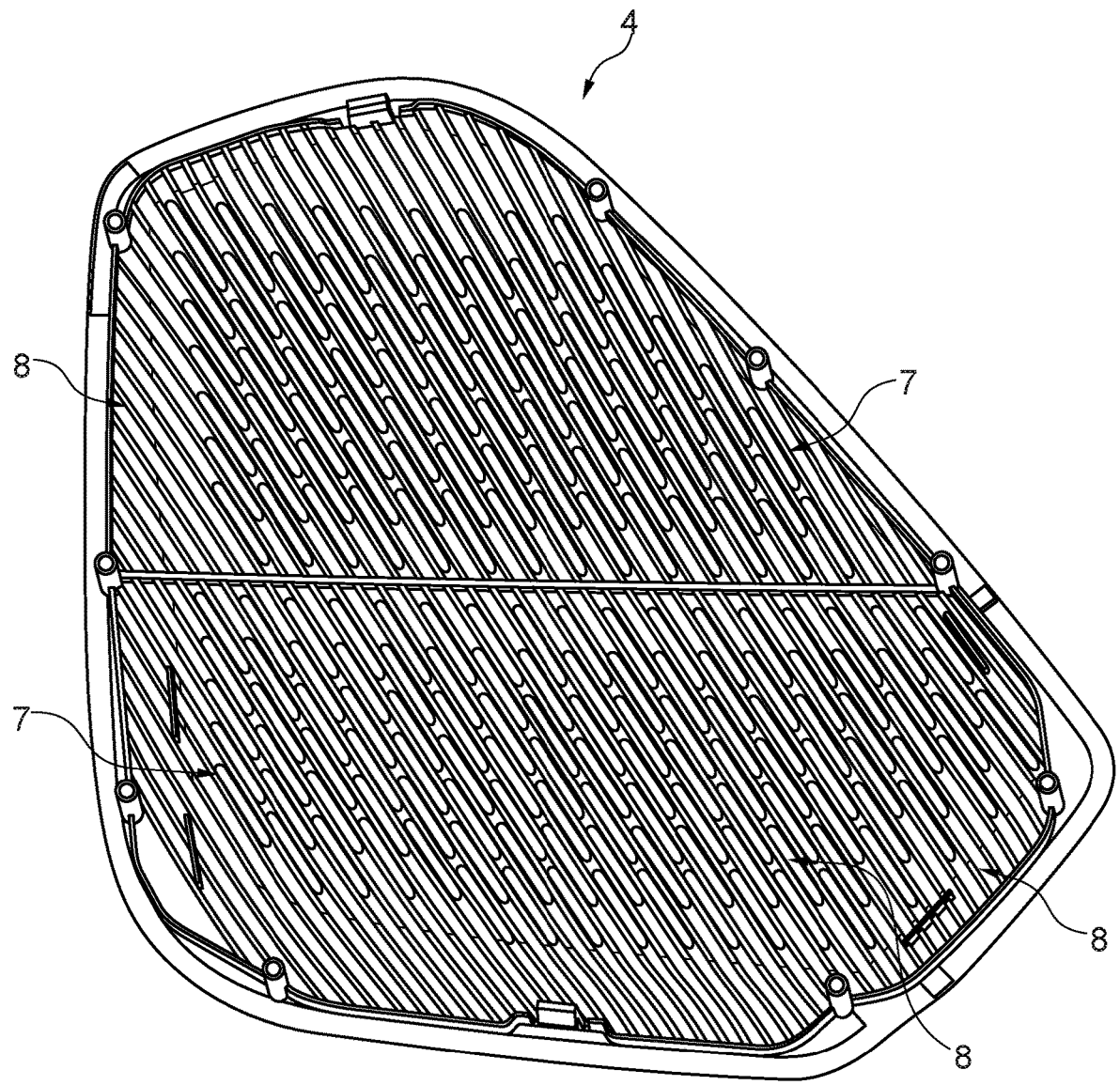
FIG. 8 schematically illustrates a bottom view of the carrier element of the system of FIG. 3, according to embodiments of the disclosure.

FIG. 8 schematically illustrates a bottom view of the carrier element 4 of the system of FIG. 3, according to embodiments of the disclosure.

The carrier element 4 has a line of ribs 8 on the back to increase the strength of the grille. As can be seen in FIG. 8, a plurality of ribs 8 extend in the longitudinal direction along the longitudinal openings 7, and at least one other transverse rib crosses in a traverse direction across the ribs 8.

Figure 9:
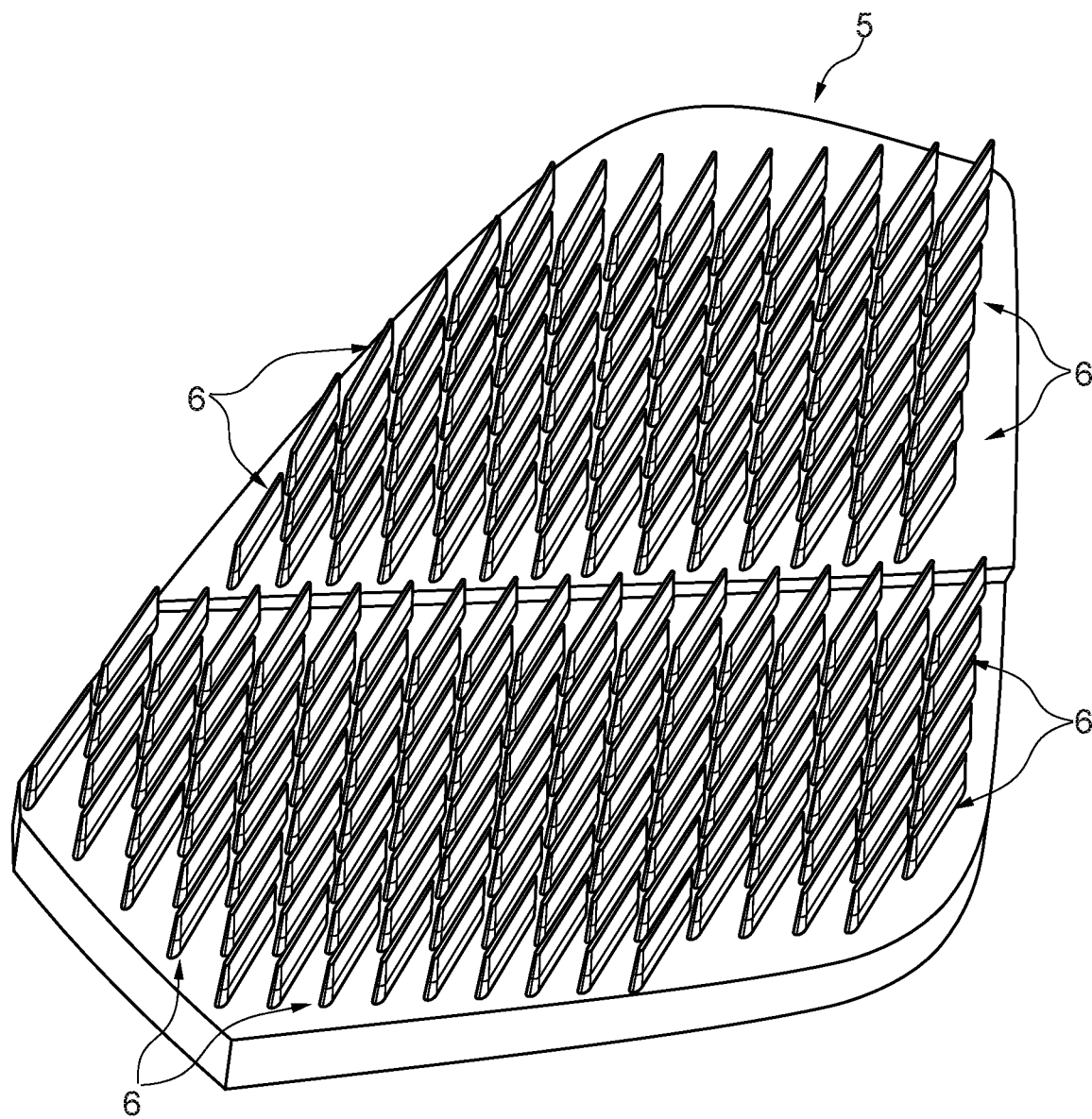
FIG. 9 schematically illustrates a top view of the fixture element of the system of FIG. 3, according to embodiments of the disclosure.

FIG. 9 schematically illustrates a top view of the fixture element 5 of the system of FIG. 3, according to embodiments of the disclosure.

The fixture element 5 comprises a number of spikes 6 corresponding to the hole pattern of the carrier element 4. The spikes 6 are thinner at the top, getting progressively wider towards the base surface of the fixture 5. This allows the carrier element 4 to slide onto the fixture element 5, and stop as the spikes 6 become wider. The spikes 6 may have heights between 25 mm and 30 mm in the example of FIG. 9. In various embodiments, the number of spikes may correspond to the number of openings in the press element 2.

In various examples, the spikes 6 may have different rates of progression of the cross-sectional area towards the base surface of fixture 5. For example, the spikes 6 may have a lower section which is tapered, i.e. has a conical shape, and a top top section, which may have a less tapered shape or even constant cross-sectional area.

Figure 10:
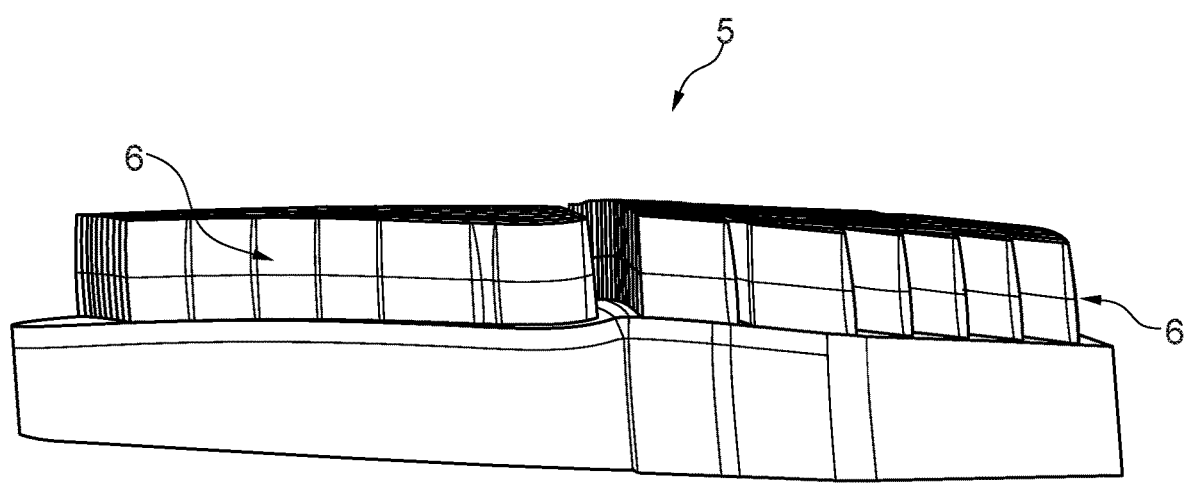
FIG. 10 schematically illustrates a side view of the fixture element of the system of FIG. 3, according to embodiments of the disclosure.

FIG. 10 schematically illustrates a side view of the fixture element of the system of FIG. 3, according to embodiments of the disclosure.

As can be seen in FIG. 10, the base surface of the fixture has a curved shape, which may be adapted to the shape of the carrier element 4. The plurality of spikes 6 have a tapered shape.

Figure 11:
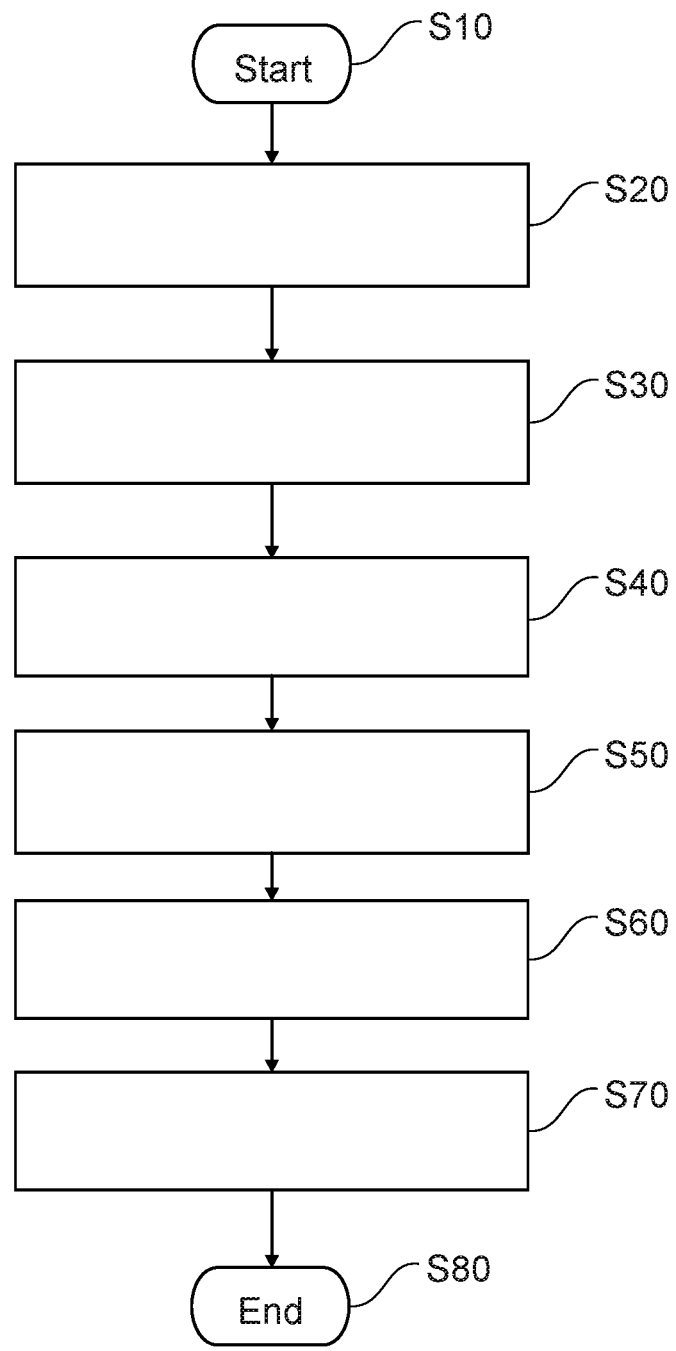
FIG. 11 schematically illustrates a method for producing a loudspeaker cover, according to embodiments of the disclosure.

FIG. 11 schematically illustrates a method for producing a loudspeaker grille 1, according to embodiments of the disclosure.

The method starts in step S10. In step S20, a fixture element comprising a plurality of spikes is provided. In step S30, a carrier element with a plurality of openings is provided. In step S40, a cover element to be attached to the carrier element is provided, wherein the cover element has a surface of an organic material and comprises a plurality of openings corresponding to the openings of the carrier element. In step S50, a press element is provided with a plurality of openings corresponding to the spikes of the fixture element and the openings in the carrier element and the openings in the cover element. In step S60, the carrier element and the cover element and the press element are arranged on the fixture element, wherein the spikes extend through the openings of the carrier element and the cover element and the press element, wherein the openings in the carrier element and the cover element are aligned to each other by the spikes protruding through the openings. In step S70, the cover element is attached to the carrier element by applying pressure onto the press element. The method ends in step S80.

Summarizing, an improved loudspeaker grille, as well as a method and system for manufacturing such a loudspeaker grill are provided, wherein sustainable long-lasting and decorative materials may be used as outer material. In various examples, the loudspeaker grille may be designed as a loudspeaker grill with a cork plastic sandwich construction in form of a cork veneer or cork leather Although the disclosure has been shown and described with respect to certain preferred embodiments, equivalents and modifications will occur to others skilled in the art upon reading and understanding the specification. The present disclosure includes all such equivalents and modifications and is limited only by the scope of the appended claims.

What is claimed is:

1. A method of manufacturing a loudspeaker cover, the method comprising:
   providing a fixture element comprising a plurality of spikes;
   providing a carrier element comprising a front surface and a plurality of openings;
   providing a cover element to be attached to the carrier element, wherein the cover element has a surface of an organic material and comprises a plurality of openings corresponding to the plurality of openings of the carrier element;
   providing a press element with a plurality of openings;
   arranging the carrier element and the cover element and the press element onto the fixture element, wherein the spikes extend through the openings of the carrier element and the cover element and the press element, and wherein the plurality of openings in the carrier element and the cover element are mechanically aligned to each other by the spikes; and
   attaching the cover element to the carrier element by applying pressure to the press element, wherein the surface of the cover element covers at least partly the front surface of the carrier element.

2. The method of claim 1, wherein:
   the spikes extend substantially perpendicular from a base surface of the fixture element; and
   the spikes have a tapered cross-sectional area becoming smaller at distances further away from the base surface.

3. The method of claim 1, wherein the spikes have an upper side wall section, which is not tapered, and a lower side-wall section which is tapered.

4. A system for producing a loudspeaker cover, the system comprising:
   a fixture element comprising a plurality of spikes;
   a carrier element with a front surface and a plurality of openings;
   a cover element to be attached to the carrier element wherein the cover element has a surface of an organic material and comprises a plurality of openings corresponding to the plurality of openings of the carrier element; and
   a press element with a plurality of openings corresponding to the plurality of spikes of the fixture element;
   wherein the openings in the carrier element and the cover element are aligned to each other by the plurality of spikes extending through the plurality of openings of the carrier element, the cover element, and the press element; and
   wherein the surface of the cover element covers at least partly the front surface of the carrier element.

5. The system of claim 4, wherein:
   the spikes extend substantially perpendicular from a base surface of the fixture element; and
   the spikes have a tapered cross-sectional area becoming smaller at distances further away from the base surface.

6. The system of claim 4, wherein the spikes have an upper side wall section, which is not tapered, and a lower side-wall section which is tapered.

7. The system of claim 4, wherein the cover element is made of a flexible organic material comprising a compound material with an organic surface.

8. The system of claim 4, wherein the cover element has a cork surface or a cork-leather surface.

9. The system of claim 4, wherein the plurality of openings in the carrier element and the cover element have substantially the same dimensions.

10. The system of claim 4, wherein the cover element extends at least partly around a side surface of the carrier element and is fixed at least partly onto the side surface of the carrier element.

11. The system of claim 10, wherein the cover element extends at least partly to a back side of the carrier element.

12. The system of claim 4, wherein in an active area defined by outer edges of outer openings of the plurality of openings arranged in a group, an open area of the plurality of openings are greater than 30% of the active area.

13. The system of claim 4, wherein:
   the plurality of openings are longitudinal openings; and
   longitudinal axes of the plurality of openings are aligned to each other.

14. The system of claim 4, wherein:
   a backside of the carrier element includes a plurality of ribs protruding from a back surface of the carrier element; and
   the ribs extend along the back surface at least partially between the plurality of openings.

* * * * *